United States Patent
Yoon et al.

(10) Patent No.: US 8,626,177 B2
(45) Date of Patent: Jan. 7, 2014

(54) METHOD OF IMPLEMENTING SUPERPOSITION CODING FOR A FORWARD LINK IN A WIRELESS COMMUNICATION SYSTEM

(75) Inventors: Young C. Yoon, San Diego, CA (US); Shu Wang, San Diego, CA (US); Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 979 days.

(21) Appl. No.: 11/750,214

(22) Filed: May 17, 2007

(65) Prior Publication Data
US 2007/0270170 A1 Nov. 22, 2007

Related U.S. Application Data

(60) Provisional application No. 60/801,548, filed on May 17, 2006.

(51) Int. Cl.
*H04W 72/00* (2009.01)
*H04B 7/00* (2006.01)
*H04B 7/02* (2006.01)

(52) U.S. Cl.
USPC .......................... 455/450; 375/267; 455/509

(58) Field of Classification Search
USPC ..................... 455/509, 463; 375/267, 260
See application file for complete search history.

(56) References Cited

U.S. PATENT DOCUMENTS

| | | | |
|---|---|---|---|
| 7,031,249 B2 * | 4/2006 | Kowalski ....................... 370/203 |
| 7,411,895 B2 * | 8/2008 | Laroia et al. ................... 370/203 |
| 7,623,553 B2 * | 11/2009 | Bhushan et al. ................. 370/527 |
| 2005/0075124 A1 * | 4/2005 | Willenegger et al. .......... 455/522 |
| 2007/0060167 A1 * | 3/2007 | Damnjanovic et al. ........ 455/450 |
| 2007/0250638 A1 * | 10/2007 | Kiran et al. .................... 709/236 |
| 2009/0003466 A1 * | 1/2009 | Taherzadehboroujeni et al. .............................. 375/260 |

FOREIGN PATENT DOCUMENTS

| | | | | |
|---|---|---|---|---|
| EP | 1610486 | | 12/2005 | |
| EP | 1610486 A2 * | 12/2005 | | ............... H04L 1/00 |
| JP | 2000068959 | | 3/2000 | |

(Continued)

OTHER PUBLICATIONS

WO 2004/075470 A2, Laroia et al; Controlled Superposition Coding in multi-user communication systems, Sep. 2004, PCT WIPO, 65 pages.*

(Continued)

*Primary Examiner* — George Eng
*Assistant Examiner* — Sowmini Nair
(74) *Attorney, Agent, or Firm* — Lee, Hong, Degerman, Kang & Waimey

(57) ABSTRACT

A method of transmitting at least one data stream using superposition coding (SPC) in a wireless communication system is disclosed. More specifically, a method includes receiving feedback information from at least two access terminals (ATs), assigning the at least two ATs as a first AT or a second AT based on the feedback information, wherein the first AT has a smaller path loss than that of the second AT, and the second AT has a larger path loss than that of the first AT, channel coding the at least one inputted data stream by a channel coding scheme, modulating the at least one data stream using layered modulation scheme, allocating wireless resources to symbols of the first AT and the second AT, and transmitting the symbols to at least one of the first AT and the second AT according to the allocated wireless resources.

28 Claims, 5 Drawing Sheets

(56) References Cited

FOREIGN PATENT DOCUMENTS

| | | |
|---|---|---|
| JP | 2003134046 | 5/2003 |
| JP | 2009533933 | 9/2009 |
| WO | 2004/075442 | 9/2004 |
| WO | 2004075470 | 9/2004 |
| WO | WO 2004/075470 A2 * 9/2004 | ............ 370/203 |

OTHER PUBLICATIONS

Bopping, et. al., "Superposition Coding in the Downlink of Cdma Cellular Systems", XP010941240, Apr. 3, 2006; 2006 IEEE Wireless Communication and Networking Conference; vol. 4, pp. 1978-1983.

Pietrzyk et al., "Subcarrier and Power Allocation for QoS-aware OFDMA Systems Using Embedded Modulation", IEEE International Conference, vol. 6, pp. 3202-3206, Jun. 20, 2004.

Hossain et al., "Hierarchical Constellations for Multi-Class Data Transmission over Block Fading Channels", Vehicular Technology Conference, 2004, IEEE 59th, May 17, 2004, vol. 2, pp. 934-938.

Vitthaladevuni et al., "A Recursive Algorithm for the Exact BER Computation of Generalized Hierarchical QAM Constellations", IEEE Transactions on Information Theory, vol. 49, Issue: 1, pp. 297-307, Jan. 2003.

Okuda et al., "A Study on Parallel Multiple Transmission Using Hierarchical Modulation", NTT Wireless Systems Laboratories, 1998.

* cited by examiner

METHOD OF IMPLEMENTING SUPERPOSITION CODING FOR A FORWARD LINK IN A WIRELESS COMMUNICATION SYSTEM

This application claims the benefit of U.S. Provisional Application No. 60/801,548, filed on May 17, 2006, which is hereby incorporated by reference.

BACKGROUND OF THE INVENTION

1. Field of the Invention

The present invention relates to a method of implementing superposition coding, and more particularly, to a method of implementing superposition coding for a forward link in a wireless communication system.

2. Discussion of the Related Art

Today, users of wireless communication enjoy freedom of mobility. That is, the user with a mobile terminal is able to travel from one place to another while talking to someone without losing connection. Often, a user moves from one service coverage area to another service coverage area (e.g., from one cell to another cell). At the same time, a user moves from one place to another within the same coverage area or cell/sector.

When multiple users move about within the same cell/sector, it is important for a base station (BS) or a network to transmit messages to these multiple users. Some of the users may be close to the BS while some may be far away. Regardless, it is important for the user to continue receiving the message without interruption and not lose connection.

To this end, it is important that the signals from the BS are transmitted to the users (e.g., mobile station or access terminal) more efficiently and more reliably so as to provided effective service to the users in the current service coverage area.

SUMMARY OF THE INVENTION

Accordingly, the present invention is directed to a method of implementing superposition coding for a forward link in a wireless communication system that substantially obviates one or more problems due to limitations and disadvantages of the related art.

An object of the present invention is to provide a method of transmitting at least one data stream using superposition coding (SPC) in a wireless communication system.

Another object of the present invention is to provide a method of transmitting at least one data stream using superposition coding (SPC) in an orthogonal frequency division multiplexing (OFDM) system.

A further object of the present invention is to provide a method of transmitting at least one data stream using superposition coding (SPC) in a high speed downlink packet access (HSDPA) system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting at least one data stream using superposition coding (SPC) in a wireless communication system includes receiving feedback information from at least two access terminals (ATs), assigning the at least two ATs as a first AT or a second AT based on the feedback information, wherein the first AT has a smaller path loss than that of the second AT, and the second AT has a larger path loss than that of the first AT, channel coding the at least one inputted data stream by a channel coding scheme, modulating the at least one data stream using layered modulation scheme, allocating wireless resources to symbols of the first AT and the second AT, and transmitting the symbols to at least one of the first AT and the second AT according to the allocated wireless resources.

In another aspect of the present invention, a method of transmitting at least one data stream using superposition coding (SPC) in a wireless communication system includes layer modulating at least one of data portions of the at least one data stream or preamble of the at least one data stream if the data portions overlap for a first AT and a second AT, wherein the first AT has a smaller path loss than that of the second AT, and the second AT has a larger path loss than that of the first AT, and transmitting the symbols to at least one of the first AT and the second AT.

In a further aspect of the present invention, a method of transmitting at least one data stream using superposition coding (SPC) in an orthogonal frequency division multiplexing (OFDM) system includes receiving feedback information from at least two access terminals (ATs), assigning the at least two ATs as a first AT or a second AT based on the feedback information, wherein the first AT has a smaller path loss than that of the second AT, and the second AT has a larger path loss than that of the first AT, modulating the at least one data stream using layered modulation scheme, allocating wireless resources to symbols of the first AT and the second AT, and transmitting the symbols to at least one of the first AT and the second AT according to the allocated wireless resources.

Yet, in another aspect of the present invention, a method of transmitting at least one data stream using superposition coding (SPC) in a high speed downlink packet access (HSDPA) system includes receiving feedback information from at least two access terminals (ATs), assigning the at least two ATs as a first AT or a second AT based on the feedback information, wherein the first AT has a smaller path loss than that of the second AT, and the second AT has a larger path loss than that of the first AT, modulating the at least one data stream using layered modulation scheme, allocating wireless resources to symbols of the first AT and the second AT, and transmitting the symbols to at least one of the first AT and the second AT according to the allocated wireless resources.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In a wireless communication system, due to mobility of access terminals (ATs), the ATs can be close to or far from a base station (BS) of a serving cell/sector at any given time. As such, these ATs can have different path losses. For example, the AT close to the BS may have very small path loss while the AT far away from the BS may have significantly more path loss due to the distance.

Assume there are two (2) ATs in a serving cell. One of which is close to the BS ("Close_AT") while the other one is far from the BS ("Far_AT"). A Close_AT is an AT close to the BS in the sense that is experiences small path loss. More specifically, the Close_AT is an AT whose channel quality indicator (CQI) is less than some or a prescribed CQI threshold. A Far_AT is an AT far from the BS in the sense that it experiences large path loss. More specifically, the Far_AT is an AT whose CQI is greater than some or a prescribed threshold.

Figure 1:
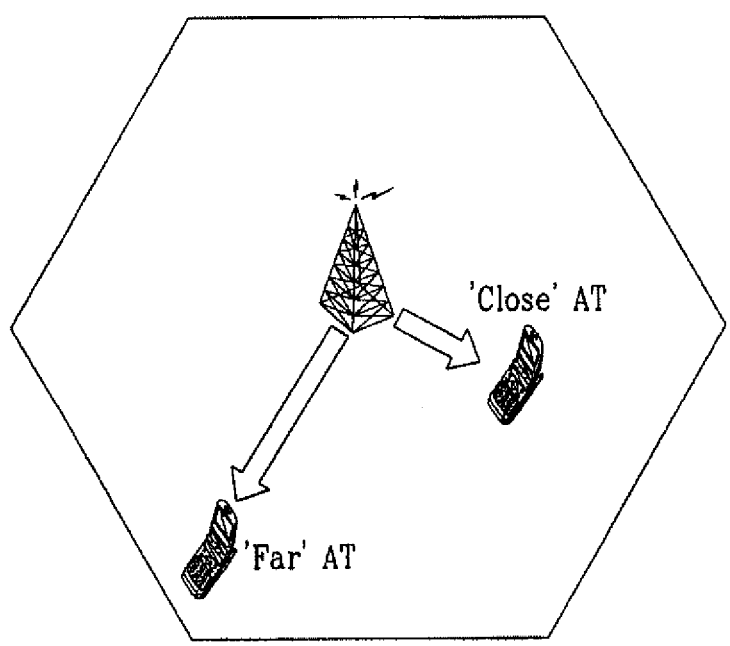
FIG. 1 is an exemplary diagram illustrating ATs close and far from a serving BS in a cellular system.

FIG. 1 is an exemplary diagram illustrating ATs close and far from a serving BS in a cellular system. Referring to FIG. 1, Close_AT experiences a small path loss whereas Far_AT experiences a large path loss. In the current systems, a set of resources, in terms of transmit power and channelization codes, may be allocated exclusively to only one of the ATs. For example, the resources are allocated for transmission to the Far_AT and exclude allocation of resources to the Close_AT as a result.

Such a limited or restricted allocation method seems inefficient and ineffective. To address this limitation, a various schemes can be used, among which is superposition coding (SPC).

In the SPC, a BS may transmit to both the Far_AT and Close_AT. In so doing, the resources in terms of transmit power and channelization codes can be controlled and shared among the two ATs. For example, since the Close_AT has a small path loss, the BS may allocate a small fraction of the transmit power to the Close_AT and a larger amount of transmit power to the Far_AT having a larger path loss. However, both ATs can use the same resources. With this approach, both ATs can experience roughly the same level of signal-to-noise ratio (SNR) (or different levels, if desired). Although both ATs share the same resources, they can be distinguished by layered modulation as explained shortly.

Figure 2:
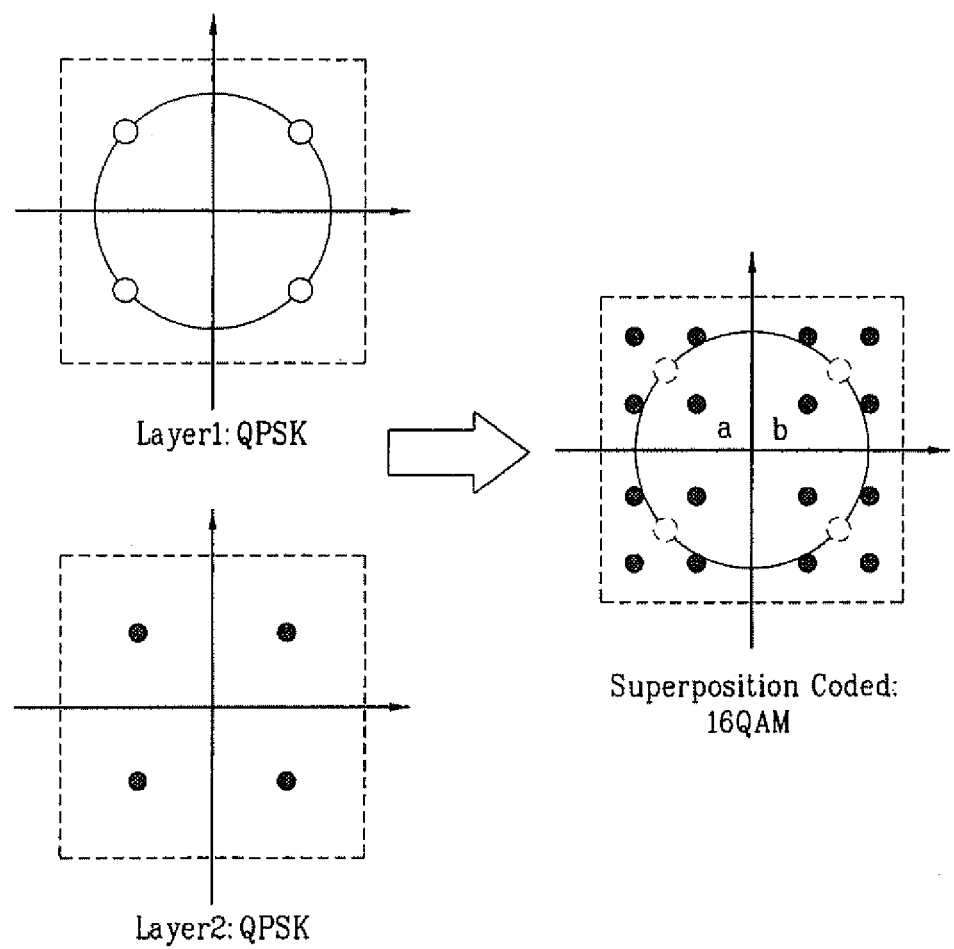
FIG. 2 is an exemplary diagram illustrating a hierarchical or layered modulation using QPSK for each layer.
Figure 3:
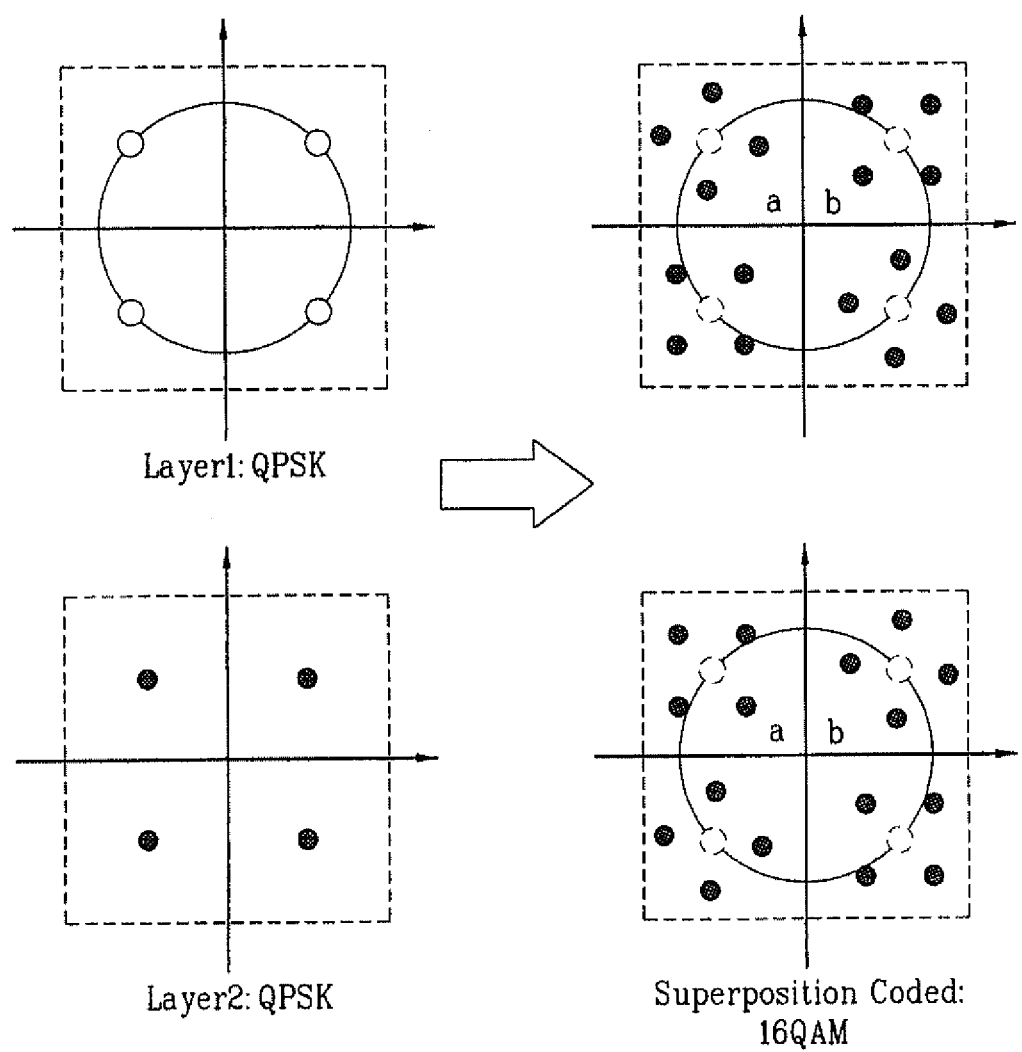
FIG. 3 is an exemplary diagram illustrating maximization of the layered or superpostioned signal(s)

The SPC can be defined by hierarchical modulation or layered modulation. As an example of layered modulation, the Close_AT and Far_AT can each use quadrature phase shift keying (QPSK) modulation. FIG. 2 is an exemplary diagram illustrating a hierarchical or layered modulation using QPSK for each layer. Referring to FIG. 2, layer 1 (inner layer) and layer 2 (outer layer) are modulated according to the QPSK scheme. Here, it is likely that the superposition modulation results in a mostly non-uniform 16 quadrature amplitude modulation (QAM). That is, the Euclidean distance between each nearest neighbor may not necessarily be identical In the alternative, as illustrated in FIG. 3, some or all of layer 2 signal modulation constellation can be properly rotated before superposition so that the minimum Euclid distance of the layered or superpositioned signal can be maximized. This idea can be applied on any other possible combinations of different or same modulation types.

Figure 4:
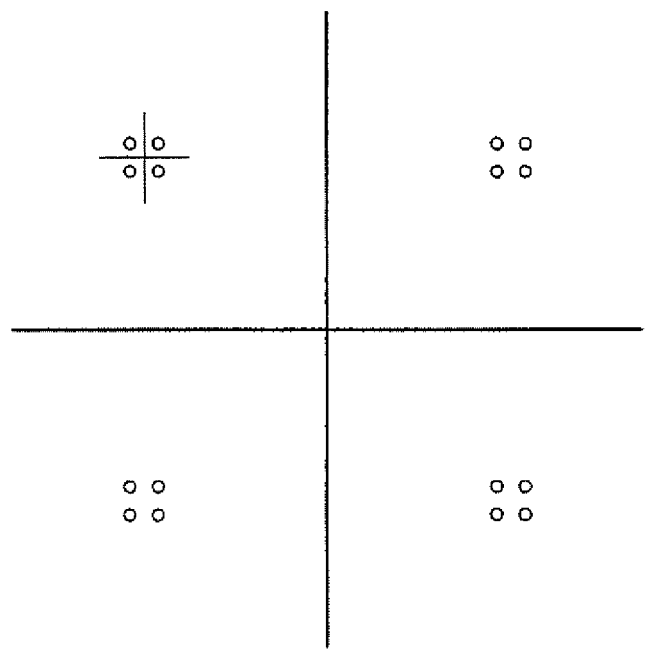
FIG. 4 is an exemplary diagram illustrating a hierarchical or layered modulation where both the Close_AT and the Far_AT each use QPSK modulation.

Further, the signals of the Close_AT and Far_AT (also referred to as Close_signal and Far_signal, respectively) can be added together to form composite signal—a 16-quadrature amplitude modulation (16-QAM) signal as shown in FIG. 4. Here, the Close_signal is a signal intended for the Close_AT, and the Far_signal is the signal intended for the Far_AT.

FIG. 4 is an exemplary diagram illustrating a hierarchical or layered modulation where both the Close_AT and the Far_AT each use QPSK modulation. Here, the decision boundaries for the Far_AT symbol detection are identical to the x-axis and y-axis. The decision boundaries for the Close_AT symbol detection are like "+" signs but centered in each cluster as shown only for the top left quadrant.

Figure 5:
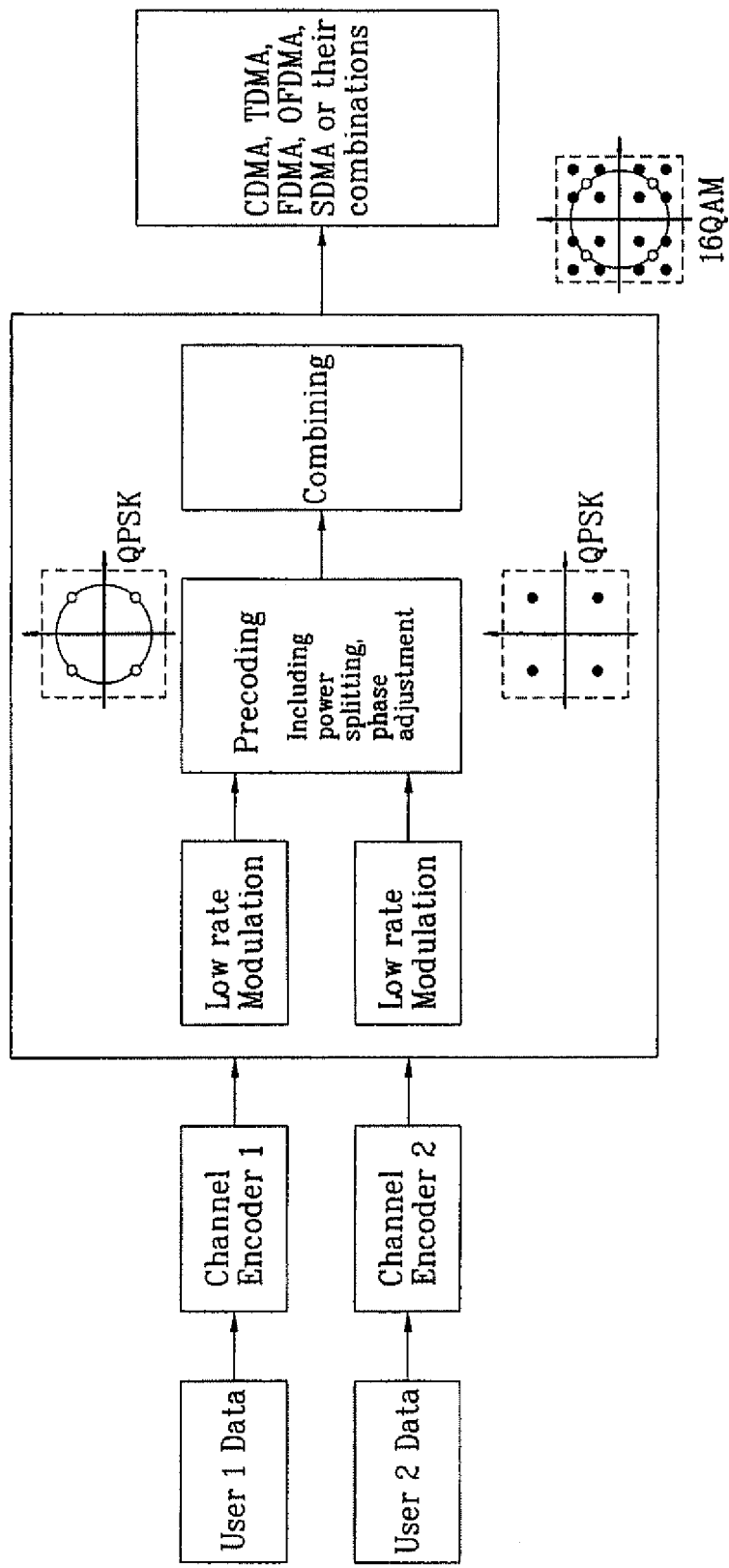
FIG. 5 is an exemplary diagram illustrating superposition modulation or layered-modulation.

In general, SPC can be described as follows. FIG. 5 is an exemplary diagram illustrating superposition modulation or layered-modulation. More specifically, referring to FIG. 5, each user's signal or data stream can be modulated with a modulation scheme such as a low-order modulation scheme. Thereafter, the superposition modulated or layered-modulated sub-streams can again be multiplexed (or superpositioned) by other multiplexing schemes. Consequently, the data streams can be efficiently multiplexed without requiring additional processing gain and/or additional frequency/time.

As shown in FIG. 5, the channel coded data streams are modulated using a modulation, followed by pre-coding (or superpositioning/multiplexing). Here, each channel coded data stream is modulated by a quadrature phase shift keying (QPSK), and they are pre-coded or superpositioned to 16 quadrature amplitude modulation (QAM). In other words, the pre-coded symbols are combined to 16QAM. The pre-coding includes power splitting as well as phase adjustment. Further, channel coding schemes can include turbo coding, convolutional coding, or Reed-Solomon coding.

In addition, other modulation schemes that can be used include a phase shift keying (PSK) and a rotated-PSK, QAM with different amplitudes, QPSK and a 16QAM, QPSK and 64QAM, a Gaussian minimum shift keying (GMSK) and PSK, and the GMSK and the QAM. Here, the PSK and the rotated-PSK is further defined by any one of a binary PSK (BPSK) and a rotated-BPSK, the QPSK and a rotated-QPSK, and a 16PSK and a rotated-16PSK.

When multiple users are simultaneously accommodated within a specified time-frequency slot, various multiplexing schemes and combinations thereof can be used. With superpositing, a single symbol can serve multiple users.

To illustrate this point regarding superposition pre-coding, consider that a single transmitter can be used to transmit simultaneously data streams to several receiving ends (or users). The data streams can be the same (e.g. TV broadcast) or it may be different for each user (e.g., base station transmitting user-specific information). In addition, assumption can be made that independent data streams are sent to each user from the transmitter having multiple antennas.

That is, in transmitting the multiplexed or superposited sub-streams (or symbols), the same combined symbols can be transmitted through the whole beamforming array, for example. This can be referred to as coherent beamforming. Alternatively, each symbol or sub-stream (e.g., some subset of the symbol constellation or each user's sub-symbol) can be transmitted separately or independently through different antennas, for example. This can be referred to as coherent multi input, multi output (MIMO).

Furthermore, if there are multiple beams used for transmission, more user capacity gain can be achieved through spatial multiplexing, for example. More specifically, each beam can carry composite symbol (e.g., single-beamforming or coherent beamforming). Alternatively, each low-order-modulated symbol or sub-stream can be transmitted through a single beam, for example. Alternatively, a combination of the beamforming schemes can be used, which can be described as some beams can carry composite symbols and some beams can be transmitted through a single beam.

In addition, space-time block coding (STBC) can be employed, for example. More specifically, in case of a single-stream STBC, the STBC can be performed after modulation multiplexing or superpositioning and/or performed on multiple inputted low-order-modulated symbols or sub-streams. In case of multi-stream STBC, each sub-stream can be treated as a single STBC, each low-order-modulated symbol or sub-stream can be transmitted through a single STBC stream, and/or some STBC streams can use a combination of the aforementioned schemes, in which each of some streams are treated as a single-stream STBC and each of some low-order-modulated streams is transmitted through a single STBC stream.

In order for successful performance by the superposition scheme, a predetermined rate/power splitting for each user from the transmitting end and the SIC from the receiving end can be used, for example. If the rate or power slitting is not predetermined, the transmitter will signal the receiver(s) beforehand or at the same time using upper-layer signaling, or preamble or different pilot pattern.

The SPC can be applied to various wireless communication systems including code division multiple access 2000 (cdma2000), global system for mobile communications (GSM), wideband cdma (WCDMA), high speed downlink packet access (HSDPA), worldwide interoperability for microwave access (WiMAX), evolution-data optimized (EV-DO), orthogonal frequency division multiplexing (OFDM), OFDM access (OFDMA), and code vision multiplexing (CDM).

In view of inefficiencies associated with allocating transmit power/channelization codes exclusively to only one AT, all ATs applying the SPC can receive symbols/signals transmitted from the serving BS. As discussed, the SPC allows for the BS to transmit to all the ATs in its serving cell/sector.

As the BS is able to transmit to all the ATs in its serving cell/sector, it may be important for the BS to control the way in which the transmission is made to each and/or all ATs. That is, the BS or (serving BS) may control transmission to a number of SPC-applied ATs, control transmit power level, and alignment of sub-packet.

Since the SPC allows for the BS to transmit to all the ATs in its cell/sector, it is possible that a large number of ATs are present in the serving cell/sector at a given time. If there are a large number of ATs in the serving cell/sector at a given time, transmissions to all the ATs by the serving BS can become complex. In response, it is possible to limit or fix the maximum number of ATs, to which SPC is applied, at any given time. Here, this maximum number can be configurable and can be set to provide optimum transmission.

For example, the system can define the maximum number of SPC-applied ATs to be two (2). This implies that the BS can transmit with a set of channelization codes (or resources) to 0, 1 or 2 ATs. Here, the BS transmits SPC symbols (or sub-streams) to the ATs. To put differently, the BS can transmit the SPC symbols to no ATs, a Close_AT, a Far_AT, or both Close_AT and Far_AT.

Further, in transmitting the SPC symbols, transmit power levels can be fixed for each layer (or power ratios between layers) at any given time. For example, if there are a Close_AT and a Far_AT, the Close_AT can be allocated less transmit power relative to the Far_AT. In other words, the Close_AT can be allocated −10 dB transmit power relative to the Far_AT. As discussed, the Close_AT generally refers to an AT that experiences smaller path loss relative to the Far_AT. The number or value (e.g., −10 dB) that can be allocated to the Close_AT can be fixed for a system, and/or it can also be configured. Alternatively, independent transmit powers can be allocated for each layer at any given time.

For systems using automatic repeat requests (ARQ) or variants of it (e.g., Hybrid ARQ), the $1^{st}$ sub-packet for the Close_AT packet and the Far_AT packet can be aligned but need not be aligned.

From the ATs perspective, it is important for the ATs to properly receive the SPC symbols/packets transmitted from the serving BS. As such, each AT receives and decodes the SPC symbol and/or SPC packet.

More specifically, the detection can be made for symbols as well as packets. With respect to symbol detection, the Far_AT can decode each received symbol according to conventional means. As for the Close_AT the Close_AT can first decode the symbol for the Far_AT and "removes" or "cancels" the Close_AT symbol from the received symbol. In other words, the Far_AT symbol is first decoded. Ideally, the Close_AT signal remains but due to imperfect cancellation, there usually exists residual noise, interference, and/or leftovers from the Far_AT signal. The Close_AT then performs symbol detection on this residuel signal for the Close_AT signal.

Alternatively, packet detection is available. The procedures associated with packet detection is same as those of the symbol detection except that the Close_AT "removes" the Far_AT signal only after is successfully decodes the Far_AT packet. This typically can be achieved if the check or cyclic redundancy code (CRC) or "checksum" passes—indicating a successful decoding operation of the packet.

As discussed with reference to FIG. 1, the ATs in a serving cell/sector can be identified as a Close_AT or a Far_AT, depending on degree of path loss, for example. Moreover, the Close_AT and/or Far_AT can be defined based on a prescribed CQI threshold. Here, data rate control (DRC) can also be used in place of CQI.

Further, the BS can designate the AT as being close or far. More specifically, the BS can designate an AT as a Close_AT based on reported CQI, a data rate control (DRC), or some moving average received by the system is below (or possibly equal to) a prescribed value (e.g., Close_CQI_Threshold). The CQI is transmitted from an AT to a BS transmitter which can be used for link adaptation and/or rate control and scheduling the ATs.

In addition, the BS can designate an AT as a Far_AT based on reported CQI, DRC, or some moving average received by the system is above (or possibly equal to) a prescribed value (e.g., Far_CQI_Threshold). The DRC is transmitted by the AT to the BS transmitter and has a similar purpose to that of the CQI. However, it can also indicate the data rate the BS should use when transmitting data to the AT. Similarly to CQI, the DRC can be used for link adaptation and/or rate control and scheduling the ATs.

Alternatively, an AT can designate itself as a Close_AT or a Far_AT. More specifically, an AT can designate itself as a Close_AT if its CQI, DRC, or some moving average is below (or possibly equal to) a prescribed value (e.g., Close_C-QI_Threshold). The Close_CQI (or DRC)_Threshold represents a threshold value below which an AT is designated as a Close_AT. In addition, an AT can designate itself as a Far_AT if its CQI, DRC, or some moving average is above (or possibly equal to) a prescribed value (e.g., Far_CQI_Threshold). The Far_CQI (or DRC)_Threshold represents a threshold value below which an AT is designated as a Far_AT. The Close_CQI_Threshold and the Far_CQI_Threshold may or may not be equal.

Further to designating an AT as a Close_AT or a Far_AT, the serving BS can also schedule an AT. With respect to scheduling of the AT, a Close_AT can be scheduled as a Close_AT, a Far_AT, or possibly as a Regular_AT. As for scheduling of a Far_AT, the Far_AT can be scheduled as a Far_AT or a Regular_AT. Here, the Regular_AT is an AT operating in the absence of the SPC concept as in legacy systems.

Further, to prevent ping-pong effect between the Close_AT and the Far_AT, hysterisis can be added, similar to that of power control add and/or delete regions for soft handover. Alternatively, if the Close_CQI_Threshold is lower than the Far_CQI_Threshold, AT can be required to read both the Close_CQI_Threshold and Far_CQI_Threshold. This can be accomplished by setting the Close_CQI_Threshold to be greater than the Far_CQI_Threshold.

The discussion of SPC as described above can relate to various cellular, wireless communication systems such as cdma2000, GSM, WCDMA, HSDPA, WiMAX systems. To put differently, the above discussion can be defined as a general description. The discussion to follow is more specific to cdma2000 or EV-DO/IS-856 1xEV-DO system which includes revisions 0, A, and B type systems.

With respect to cdma2000 or EV-DO/IS-856 1xEV-DO system, the SPC can be applied to the data portions (non-pilot or MAC burst) if the data portions overlap for the Close_AT and the Far_AT. More specifically, a symbol for the Close_AT and a symbol for the Far_AT can be applied to a length 16 Walsh code. This application of the symbol can be repeated for each Walsh code.

In addition, the SPC can be applied to the preamble portions if they overlap for the Close_AT and the Far_AT. More specifically, the symbol for the Close_AT and the symbol for the Far_AT can be applied to a length 64 Walsh code.

Furthermore, the SPC can be applied to the preamble and the data portion if for the Close_AT and the Far_AT. The preamble and the data portion overlap if the first sub-packets of the preamble and of the data portion are aligned.

The power level for transmission to the Close_AT and the Far_AT can be fixed. More specifically, the BS (or network) can set the transmit power level of the data and the preamble destined for the Close_AT to Close_Power_Level. The Close_Power_Level is a transmit power level for the Close_signal which is a signal intended for the Close_AT.

In addition, the serving BS can set the transmit power level of the data and the preamble destined for the Far_AT to Far_Power_Level. The Far_Power_Level is a transmit power level for the Far_signal which is a signal intended for the Far_AT.

As discussed, similarly to CQI, the DRC can be used for link adaptation and/or rate control and scheduling the ATs. Moreover, the BS can designate an AT as a Close_AT or a Far_AT based on the DRC reported from the AT.

To schedule the Close_AT, a BS scheduler can use a Close_DRC for scheduling Close_ATs. The Close_DRC is a DRC which quantized the rate closest to the ratio of the Close power level to the Total power level (Close+Far Power Level). Furthermore, the BS scheduler can use rate control for determining the data rate for transmitting to the Close_AT. In addition, the Close_AT can be scheduled on either the close or far preamble, and the Close_signal or Far_Signal version of the forward traffic channel (FTC). Here, the close AT can detect both preambles.

To schedule the Far_AT, the BS Scheduler can use the Far_DRC for scheduling Far_ATs. The Far_DRC can be either set to the DRC or the DRC quantized to the rate closest to the ratio of the Far power level to the Total power level (Close+Far Power Level). Furthermore, the BS scheduler can use rate control for determining the data rate for transmitting to the Far_AT. In addition, the Far_AT can be scheduled on the far preamble and Far_signal version of the FTC.

Further to application of the SPC in cdma2000 or IS-856 1xEV-DO system, the SPC can also be applied to OFDM type systems.

The SPC can be applied to a set of OFDM tones (or signals) in a packet data channel (PDCH). More specifically, the SPC can be applied to a set of OFDM tones (or signals) intended for both the Close_AT and the Far_AT. The symbols for the close signals can be set to the Close_Power_Level to generate a Close_PDCH. The symbols for the far signals can be set to the Far_Power_Level to generate a Far_PDCH. The two signals can then be added to generate the composite signal (e.g., layered modulation or hierarchical modulation). Here, the composite signal can be generated with different approaches. For example, the symbols can be added first to generate composite symbols.

In terms of scheduling the Close_AT and/or the Far_AT, the BS scheduler (or the network) can use the CQI. More specifically, the BS scheduler can use the Close_CQI for scheduling Close_ATs. Similarly, the BS scheduler can use the Close_CQI for scheduling rate control. Here, the rate control can be used to determine the data rate for transmitting to the Close_AT.

As for scheduling the Far_AT, the BS scheduler (or the network) can use the Far_CQI for scheduling Far_ATs and for scheduling rate control. Here, the rate control can be used for determining the data rate for transmitting to the Far_AT.

With respect to packet data control channel (PDCCH), a Close_PDCCH and a Far_PDCCH can be defined. The PDCCH can be used to indicate the scheduled AT (MAC ID) as well as the rate, modulation, and coding scheme used in the associated PDCCH. Here, the Close_PDCCH can carry the control information for the Close_PDCCH. Similarly, the Far_PDCCH can carry the control information for the Far_P-DCCH.

In addition, the SPC can be applied to the Close_PDCCH and the Far_PDCCH. In this case, the same resources or channelization codes can be used or shared by the Close_P-DCCH and the Far_PDCCH. However, it is possible to not apply the SPC. That is, separate or independent channelization codes can be used by the Close_PDCCH and the Far_P-DCCH.

Furthermore, the PDCCHs can include a field indicating a layer number. The layer number can be applied in SPC cases. For example, if the SPC is two layers, a 1-bit field can indicate whether the PDCCH is a Close_PDCCH or a Far_PDCCH. Moreover, if more layers are used or needed, the field can use more bits (e.g., use two bits for 3 or 4 layers).

Further to using a field to indicated a layer number, the PDCCHs can include a field indicating a transmit power level if dynamic power level adjustment is desired. For example, if two layers for SPC is used, the Close_PDCCH can carry the Close signal power level, and the Far_PDCCH can carry the Far signal power level.

In addition, the Close_PDCCH can carry both the Close and Far power levels, the Close power level and a ratio of the Far to the Close power levels, the Far power level and a ratio of the Close to the Far power levels, or some other combination which conveys the Close and Far power levels.

Alternatively, the Close_PDCCH can omit the Close and/or Far power levels. For example, omission can be used if the receiving end can estimate the Close power level and the Far power level.

Further, a number of bits used to indicate the power level in the PDCCH can be reduced. To this end, a layer number can be used to indicate the transmit power level. For example, if the layer number is used to indicate a Far_PDCCH, then this indicates, like a most significant bit (MSB), that the power level is high. In this case, the power level bits can be used to indicate at a finer quantization level the high power. Similarly, for example, the layer number is used to indicate a Close_PDCCH, then this indicates, like the MSB, that the power level is low. In this case, the power level bits can be used to indicate at a finer quantization level the high power. In operation, the mapping of the layer number to the power level can be preset (e.g., set to a default at the AT) or configured.

As discussed, a field can be used to indicate various information such as a layer number and a transmit power level for the Close_AT and the Far_AT. If, however, the Close power level and the Far power level are fixed, then these fields would not be necessary.

In scheduling the Close_AT and the Far_AT, the Close_AT can be scheduled on either the Close_PDCCH or the Far_PDCCH (and Close_PDCH or Far_PDCH). Moreover, the Far_ ATs can be scheduled on the Far_PDCCH and Far_PDCH.

The discussion above relates to applying the SPC to the OFDM type systems, the discussion below relates to applying the SPC to HSDPA system.

The SPC can be applied to each of the high speed downlink shared channels (HS-DSCH). Each HS-DSCH uses a configurable number of length—16 Walsh codes. More specifically, the symbol for a Close_AT and the symbol for the Far_AT can be applied to a length 16 Walsh code. As a result, transmission to the Close_AT can take place via a Close_HS-DSCH and to the Far_AT via a Far_HS-DSCH.

It is possible for the SPC to be applied to the high speed shared control channel (HS-SCCH). Here, the symbol for the Close_AT and that for the Far_AT can be applied to the Walsh codes used to carry the HS-SCCH. As a result, transmission to the Close_AT can take place via a Close_HS-SCCH and to the Far_AT via a Far_HS-SCCH.

Preferably, separate and distinct Walsh codes can be allocated to carry the Close_HS-SCCH and the Far_HS-SCCH. Here, the Far_HS-SCCH can re-use the existing HS-SCCHs whereas the Close_HS-SCCH can use new Walsh codes.

With respect to power level, the Close_HS-DSCH can be set to the Close power level, and the Far_HS-DSCH can be set to the Far power level.

New HS-SCCHs can include a field indicating a layer number. The layer number can be applied in SPC cases. For example, if the SPC is two layers, a 1-bit field can indicate whether the HS_SCCH is a Close_HS-SCCH or a Far_HS-SCCH. Moreover, if more layers are used or needed, the field can use more bits (e.g., use two bits for 3 or 4 layers).

Furthermore, the HS-SCCHs can include a field indicating a transmit power level if dynamic power level adjustment is desired. For example, if two layers for SPC is used, the Close_HS-SCCH can carry the Close signal power level, and the Far_HS-SCCH can carry the Far signal power level.

In addition, the Close_HS-SCCH can carry both the Close and Far power levels, the Close power level and a ratio of the Far to the Close power levels, the Far power level and a ratio of the Close to the Far power levels, or some other combination which conveys the Close and Far power levels.

Alternatively, the Close_HS-SCCH can omit the Close and/or Far power levels. For example, omission can be used if the receiving end can estimate the Close power level and the Far power level.

Further, a number of bits used to indicate the power level in the HS-SCCH can be reduced. To this end, a layer number can be used to indicate the transmit power level. For example, if the layer number is used to indicate a Far_HS-SCCH, then this indicates, like the MSB, that the power level is high. In this case, the power level bits can be used to indicate at a finer quantization level the high power. Similarly, for example, the layer number is used to indicate a Close_HS-SCCH, then this indicates, like the MSB, that the power level is low. In this case, the power level bits can be used to indicate at a finer quantization level the high power. In operation, the mapping of the layer number to the power level can be preset (e.g., set to a default at the AT) or configured.

As discussed, a field can be used to indicate various information such as a layer number and a transmit power level for the Close_AT and the Far_AT. If, however, the Closer power level and the Far power level are fixed, then these fields would not be necessary.

In scheduling the Close_AT and the Far_AT, the Close_AT can be scheduled on either the Close_HS-SCCH or the Far_HS-SCCH (and Close_HS-DSCH or Far_HS-DSCH). Here, the Close_ATs would then need to detect both HS-SCCHs. Moreover, the Far_ATs can be scheduled on the Far_HS-SCCH and Far_HS_DSCH.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting at least one data stream using superposition coding (SPC) in a wireless communication system, the method comprising:

receiving feedback information from at least two access terminals (ATs);

assigning each of the at least two ATs as a first AT or a second AT based on the feedback information, wherein the first AT has a smaller path loss than the second AT;

channel coding the at least one data stream by a channel coding scheme;

modulating the at least one data stream using a layered modulation scheme;

allocating wireless resources to symbols of the first AT and the second AT; and transmitting the symbols to at least the first AT or the second AT according to the allocated wireless resources, wherein the layered modulation scheme includes an inner layer and an outer layer, wherein at least one signal modulation constellation of the outer layer is rotated, wherein the first AT and the second AT are indicated by a control channel that is used to carry control information to the at least two ATs, wherein the control information includes a field for indicating a layer number of the layered modulation scheme and a field for indicating power level bits, the layer number corresponding to the inner layer or the outer layer, wherein the layer number for the first AT is different from the layer number for the second AT, wherein a default transmit power level for the first AT and a default transmit power level for the second AT are indicated by the layer number for the first AT and the layer number for the second AT, respectively, and wherein the power level bits indicate a finer quantization level in relation to the default transmit power level for the first AT and the default transmit power level for the second AT.

2. The method of claim 1, further comprising configuring a maximum number of the at least two ATs to be supported at any given time.

3. The method of claim 1, wherein the wireless resources include the default transmit power level for at least the first AT or the second AT and channelization codes.

4. The method of claim 1, wherein the at least two ATs are located in a same cell or sector.

5. The method of claim 1, wherein the wireless communication system is any one of code division multiple access 2000 (cdma2000) system, a global system for mobile communications (GSM) system, a wideband cdma (WCDMA) system, a high speed downlink packet access (HSDPA) system, a worldwide interoperability for microwave access (WiMAX) system, an evolution-data optimized (EV-DO) system, an orthogonal frequency division multiplexing (OFDM) system, an OFDM access (OFDMA) system, or a code division multiplexing (CDM) system.

6. The method of claim 1, wherein the feedback information comprises at least channel quality information (CQI), data rate control (DRC), or moving average.

7. The method of claim 6, wherein one of the at least two ATs is assigned as the first AT if the feedback information indicates a value that is below or equal to a prescribed threshold value.

8. The method of claim 6, wherein one of the at least two ATs is assigned as the second AT if the feedback information indicates a value that is above a prescribed threshold value.

9. The method of claim 1, wherein the layered modulation scheme includes a phase shift keying (PSK) and a rotated-PSK, a quadrature amplitude modulation (QAM) with different amplitudes, a quadrature PSK (QPSK) and a 16QAM, the QPSK and 64QAM, a Gaussian minimum shift keying (GMSK) and the PSK, or the GMSK and the QAM.

10. The method of claim 9, wherein the PSK and the rotated-PSK are further defined by a binary PSK (BPSK) and a rotated-BPSK, the QPSK and a rotated-QPSK, or a 16PSK and a rotated-16PSK.

11. The method of claim 1, wherein the channel coding scheme includes any one of turbo coding, convolutional coding, or Reed-Solomon coding.

12. A method of transmitting at least one data stream using superposition coding (SPC) in a wireless communication system, the method comprising:

modulating at least data portions of the at least one data stream or a preamble of the at least one data stream using a layered modulation scheme if the at least data portions overlap for a first access terminal (AT) and a second AT, wherein the first AT has a smaller path loss than the second AT; and transmitting symbols to at least the first AT or the second AT, wherein the layered modulation scheme includes an inner layer and an outer layer, wherein at least one signal modulation constellation of the outer layer is rotated, wherein the first AT and the second AT are indicated by a control channel that is used to carry control information to ATs, wherein the control information includes a field for indicating a layer number of the layered modulation scheme and a field for indicating power level bits, the layer number corresponding to the inner layer or the outer layer, wherein the layer number for the first AT is different from the layer number for the second AT, wherein a default transmit power level for the first AT and a default transmit power level for the second AT are indicated by the layer number for the first AT and the layer number for the second AT, respectively, and wherein the power level bits indicate a finer quantization level in relation to the default transmit power level for the first AT and the default transmit power level for the second AT.

13. The method of claim 12, further comprising receiving feedback information from at least two ATs and assigning each of the at least two ATs as the first AT or the second AT based on the feedback information.

14. The method of claim 12, wherein the symbols transmitted to at least the first AT or the second AT are applied to a length 16 Walsh code.

15. The method of claim 12, further comprising allocating wireless resources to the symbols transmitted to at least the first AT or the second AT, wherein the wireless resources include channelization codes and the default transmit power level for at least the first AT or the second AT.

16. The method of claim 12, wherein the first AT and the second AT are scheduled based on data rate control (DRC).

17. A method of transmitting at least one data stream using superposition coding (SPC) in an orthogonal frequency division multiplexing (OFDM) system, the method comprising:

receiving feedback information from at least two access terminals (ATs);

assigning each of the at least two ATs as a first AT or a second AT based on the feedback information, wherein the first AT has a smaller path loss than the second AT;

modulating the at least one data stream using a layered modulation scheme;

allocating wireless resources to symbols of the first AT and the second AT; and transmitting the symbols to at least the first AT or the second AT according to the allocated wireless resources, wherein the layered modulation scheme includes an inner layer and an outer layer, wherein at least one signal modulation constellation of the outer layer is rotated, wherein the first AT and the second AT are indicated by a packet data control channel (PDCCH) that is used to carry control information to the at least two ATs, wherein the control information includes a field for indicating a layer number of the layered modulation scheme and a field for indicating power level bits, the layer number corresponding to the inner layer or the outer layer, wherein the layer number for the first AT is different from the layer number for the second AT, wherein a default transmit power level for the first AT and a default transmit power level for the second AT are indicated by the layer number for the first AT and the layer number for the second AT, respectively, and wherein the power level bits indicate a finer quantization level in relation to the default transmit power level for the first AT and the default transmit power level for the second AT.

18. The method of claim 17, wherein the wireless resources include the default transmit power level for at least the first AT or the second AT and channelization codes.

19. The method of claim 18, wherein the default transmit power level for the first AT is set to a level to generate a packet data channel (PDCH) that corresponds to the first AT.

20. The method of claim 18, wherein the default transmit power level for the second AT is set to a level to generate a packet data channel (PDCH) that corresponds to the second AT.

21. The method of claim 17, wherein the feedback information is used to schedule the first AT and the second AT and wherein the feedback information comprises at least channel quality information (CQI), data rate control (DRC), or moving average.

22. The method of claim 17, wherein the field for indicating the layer number is represented by at least one bit.

23. A method of transmitting at least one data stream using superposition coding (SPC) in a high speed downlink packet access (HSDPA) system, the method comprising:
   receiving feedback information from at least two access terminals (ATs);
   assigning each of the at least two ATs as a first AT or a second AT based on the feedback information, wherein the first AT has a smaller path loss than the second AT;
   modulating the at least one data stream using a layered modulation scheme;
   allocating wireless resources to symbols of the first AT and the second AT; and
   transmitting the symbols to at least the first AT or the second AT according to the allocated wireless resources,
   wherein the layered modulation scheme includes an inner layer and an outer layer,
   wherein at least one signal modulation constellation of the outer layer is rotated,
   wherein the first AT and the second AT are indicated by a high speed shared control channel (HS-SCCH) that is used to carry control information to the at least two ATs,
   wherein the control information includes a field for indicating a layer number of the layered modulation scheme and a field for indicating power level bits, the layer number corresponding to the inner layer or the outer layer,
   wherein the layer number for the first AT is different from the layer number for the second AT, and
   wherein a default transmit power level for the first AT and a default transmit power level for the second AT are indicated by the layer number for the first AT and the layer number for the second AT, respectively, and
   wherein the power level bits indicate a finer quantization level in relation to the default transmit power level for the first AT and the default transmit power level for the second AT.

24. The method of claim 23, wherein the layered modulation scheme is applied to each of high speed downlink shared channels (HS-DSCH).

25. The method of claim 24, wherein each of the HS-DSCH uses a configurable number of length 16 Walsh codes.

26. The method of claim 23, wherein the wireless resources include the default transmit power level for at least the first AT or the second AT and channelization codes.

27. The method of claim 23, wherein the layered modulation scheme is applied to each of high speed shared control channels (HS-SCCH).

28. The method of claim 23, wherein the field for indicating the layer number is represented by at least one bit.

* * * * *